R. KRENZ.
MACHINE FOR LOADING MACHINE GUN CARTRIDGE BELTS.
APPLICATION FILED JULY 20, 1918.
1,339,204.
Patented May 4, 1920.
3 SHEETS—SHEET 2.
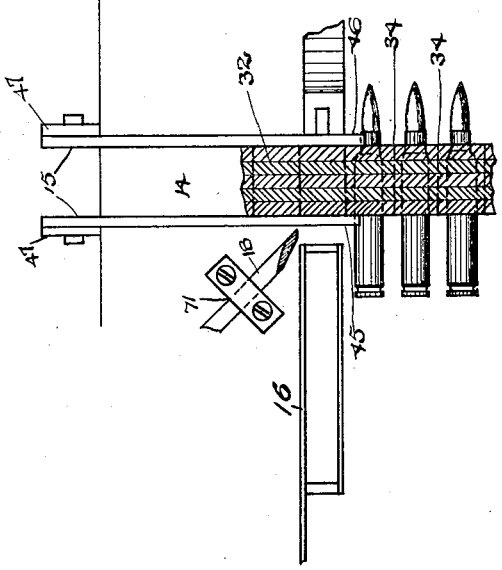
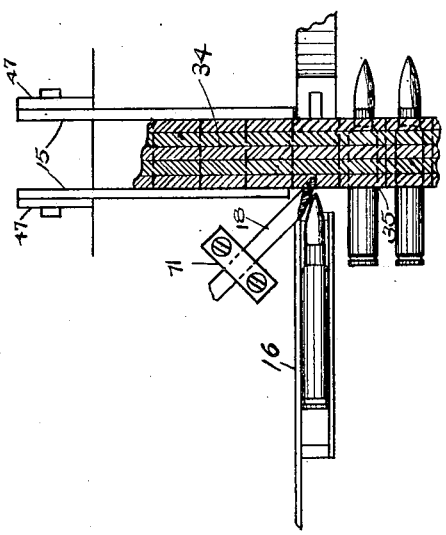

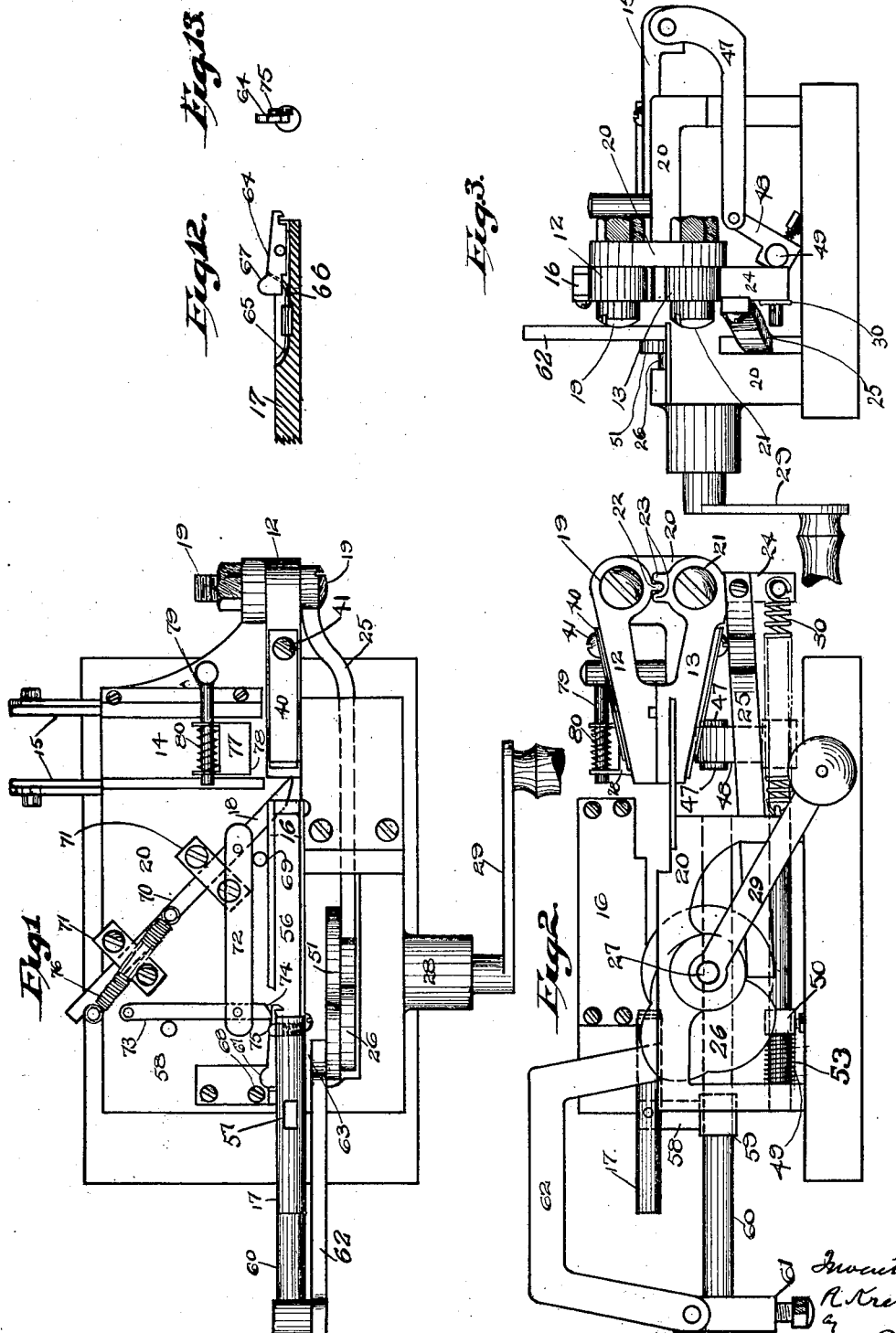

R. KRENZ.
MACHINE FOR LOADING MACHINE GUN CARTRIDGE BELTS.
APPLICATION FILED JULY 20, 1918.
1,339,204. Patented May 4, 1920.
3 SHEETS—SHEET 3.
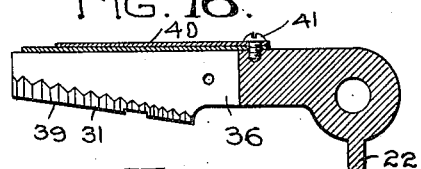
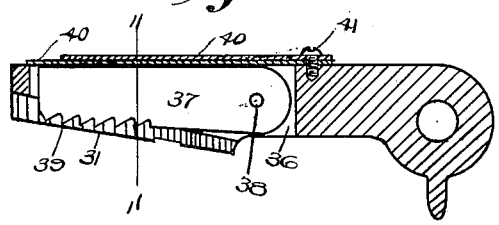 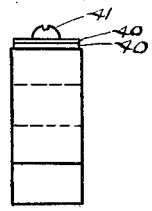
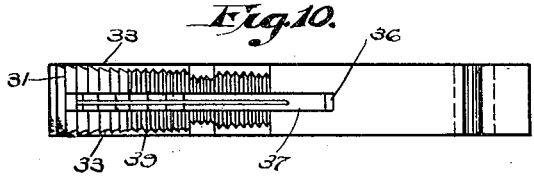
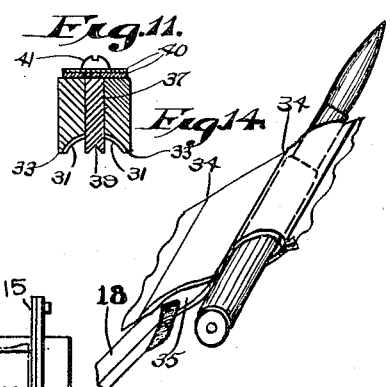 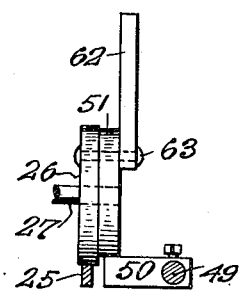
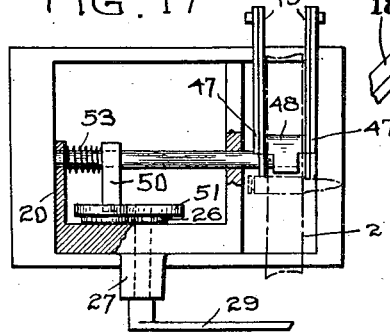

UNITED STATES PATENT OFFIC

RUDOLPH KRENZ, OF MIDDLETOWN, CONNECTICUT, ASSIGNOR OF ONE-HALF ?
H. FRISSELL, OF MIDDLETOWN, CONNECTICUT.

MACHINE FOR LOADING MACHINE-GUN CARTRIDGE-BELTS.

1,339,204.  Specification of Letters Patent.  Patented May

Application filed July 20, 1918. Serial No. 245,840.

*To all whom it may concern:*

Be it known that I, RUDOLPH KRENZ, a citizen of the United States, residing at Middletown, in the county of Middlesex and State of Connecticut, have invented a new and useful Improvement in Machines for Loading Machine-Gun Cartridge-Belts; and I do hereby declare the following, when taken in connection with the accompanying drawings and the characters of reference marked thereon, to be a full, clear, and exact description of the same, and which said drawings constitute part of this application, and represent, in—

Figure 1 a plan view of a machine for loading machine-gun cartridge-belts, constructed in accordance with my invention.

Fig. 2 a view thereof in front elevation.

Fig. 3 an end view thereof looking toward the belt-gripping jaws.

Fig. 4 a broken plan view of the machine showing a section of the cartridge-belt into which two cartridges have been loaded, and also showing the pocket-opener in the act of opening one of the pockets in the belt preparatory to the insertion of a cartridge into the pocket.

Fig. 5 a corresponding view showing the same parts after another cartridge has been loaded into the belt and it has been fed an additional step through the medium of the said cartridge, the belt-feeders being shown at the limit of their forward excursions.

Fig. 6 a broken detail view in elevation showing the inner end of the belt-guideway and the inner ends of the two reciprocating belt-feeders.

Fig. 7 a detached view in side elevation of one of the belt-feeders.

Fig. 8 a detached view in longitudinal section of the upper belt-gripping jaw.

Fig. 9 a view thereof looking toward its pivot end.

Fig. 10 a reverse plan view of the jaw.

Fig. 11 a view thereof in transverse section on the line 11—11 of Fig. 8.

Fig. 12 a broken view in longitudinal section of the cartridge-feeding plunger, showing the extractor mounted therein.

Fig. 13 an end view of the plunger.

Fig. 14 a sectional view of the belt, showing the pocket-opener about to obliquely enter one of its pockets for opening the same.

Fig. 15 a detail view showing the cam for operating the belt-gripping jaws and the cam for operating the belt-feedin nism and the cartridge-feeding-n together with the parts coöperatin said cams.

Fig. 16, a detached view in lo: section of the upper belt-gripping its pivotal auxiliary jaw removec show its tapering semi-circular re Fig. 17, a schematic view sh train of parts by which the cartri fed step-by-step through the med cartridges themselves.

My invention relates to a poi chine for loading cartridges into gun cartridge-belts, the object bei duce a compact, convenient and ef chine constructed with particular to avoiding any injury to the fal belt as the same is being loaded s life of the belt may be greatly to making the feeding of the belt upon the correct loading of each so that the feeding of the belt ? rested in case the cartridges are nc fed and loaded, and to insuring tl alinement of the cartridges in the loaded, this being effected by h belt firmly against edgewise swer time of loading.

With these ends in view, my consists in a machine for loadin{ gun cartridge-belts, having cert of construction and combination as will be hereinafter described a out in the claims.

In carrying out my invention shown, I employ a pair of com pivotal belt-gripping jaws of upper jaw 12 is located directly lower jaw 13. These jaws are ar1 right angle to the belt-guideway the belt-feeders 15, and in lin( cartridge-hopper 16 and cartric plunger 17, with their inner ends an obliquely arranged wedge-li opener 18.

The upper jaw 12 is mount screw stud or pivot 19 in the mac 20, while the lower jaw 13 is mo a corresponding stud 21 in the ! As shown, the upper jaw is foi outer or knuckle end with a dep or tooth 22 which works betwee: 23 upstanding from the outer end of the lower jaw which is als with a depending arm 24 to which is attached the outer end of an operating-arm 25 the inner end of which co-acts with a cam 26 upon the inner end of a crank-shaft 27 journaled in a bearing 28 on the machine-frame 20 and provided at its outer end with a handle 29 by which the machine is operated. The said arm 25 is constantly maintained in engagement with the cam 26 by means of a helical spring 30 attached at one end to the machine-frame 20 and at its opposite end to the lower end of the arm 24 aforesaid, whereby the jaws are operated in opening by the arm 25, and in closing by the spring 30, having corresponding movement toward and away from each other. The opposite or inner faces of the inner ends of the respective jaws are cut away to form semi-circular recesses tapering from their outer to their inner ends in substantial conformity with the taper of the bullet-ends of the cartridges and formed with serrations 31 which assist in gripping the fabric of the cartridge-belt 32. These serrations are flanked on either side by belt-gripping edges 33 which, when the jaws are closed, grip the belt substantially along the transverse lines of stitching 34 which produce its cartridge-receiving pockets 35 as clearly shown in Fig. 14. Each of the main gripping-jaws 12 and 13 is also formed with a longitudinal slot 36 receiving an auxiliary gripping-jaw 37 mounted upon a pivot 38 and having the inner edge of its inner end provided with serrations 39. Flat springs 40 secured in place at their outer ends by screws 41, are employed to normally hold the said auxiliary jaws in the position in which their serrated edges 39 project beyond the serrations 31 of the main gripping-jaws as shown in Fig. 11. These auxiliary jaws initially grip the fabric of the belt and prevent the same from being pushed and swerved laterally by the incoming bullet-ends of the respective cartridges and are gradually retired against the tension of their springs 41 until the fabric is pushed into contact with and gripped by the serrations 31, there being a gradual transference of the gripping of the fabric from the serrations 39 to the serrations 31, whereby the tapered character of the bullet-ends of the cartridges is compensated for and the belt at all times held against lateral deflection.

The woven belt 32 is fed step-by-step through the belt-guideway 14 which has overhanging side flanges or guides 42 and 43, separated from each other by the width of the belt, as shown in Fig. 6. The bottom of this guideway is level with the line on which the jaws 12 and 13 close together, so that when the jaws are opened the upper jaw is lifted above the bottom of the guideway and the lower jaw depressed below the bottom of the guideway, whereby the jaws retire and clear the way for the the belt.

For feeding the belt step-by-ste the loaded cartridges themselves unless the last cartridge has been loaded into the belt, the belt will and the machine will stop functio utilizing the last cartridge loac step-by-step feeding of the belt, two reciprocating bar-like belt-fee cated on opposite sides of the 14, having their lower edges in grooves 56ª therein and having t edges entered into grooves in the ing side flanges 42 and 43. The of these cartridge-feeders are con 44 to fit the curvature of the ca the same project from either side at the points 45, 46, as shown in The said feeders extend rear yond the rear end of the guidev are pivotally connected with the of links 47 the inner ends of pivotally connected with a rock mounted upon the adjacent end shaft 49 journaled in the machir and carrying a cam-lever 50 ext ward into position to be acted u belt-feeding cam 51 on the crar A helical spring 53 encircling t and also attached to the machin exerts a constant effort to hold 1 in engagement with the cam 51 through the said arm to rock t and hence the rocker-arm 48 through the links 47 to reciproc tridge-feeders 15 which act up jecting ends of the successive after the same have been inser belt 32, to feed the same forwa step. After the cartridge-feed reached the limit of their forwar they are retracted by the revers the shaft 49 which is effected by of the spring 53.

The cartridges are fed into 35 in the woven belt 32 from th by means of a bolt-like plunger in a groove 56 in the machine-f reciprocating in line with the he the jaws 12 and 13. For its r the plunger, is formed with a 57 receiving a finger 58 upstan collar 59 on a reciprocating sl ing bearing in the machine-fr provided at its outer end with pivotally connected by an upstar link 62 with a crank-pin 63 in To provide for the extractio tridge being fed, in case the comes blocked or fouled in an from whatever cause, I pivotal extractor 64 in a slot 65 in the the extractor being furnished v 66 by means of which its hoo end is normally held in engagement with the head of the cartridge. At its rear end the extractor has a cam 67 which engages with a pin 68 located in the machine-frame in position to open the extractor at the limit of the rearward excursion of the plunger 17, so that the hooked forward end of the extractor may engage with the head of the cartridge, at the time the same is fed into position in front of the plunger. A corresponding pin 69 is located in position to engage with the cam 67 when the plunger reaches the limit of its forward excursion so as to release the cartridge when the same has been fully fed.

In order to successively open the cartridge-pockets 35 in the belt 32 preparatory to the introduction of the cartridges into the pockets, I employ a pocket-opener 18 consisting, as shown, of a bar having a wedge-like inner end. As herein shown, the opener is arranged obliquely with respect to the jaws 12 and 13 and the hopper 16 (Fig. 4), and is timed so that after the belt has been fed one step it advances to enter the rear corner of the particular pocket of the belt, gripped between the jaws, and then moves inward and forward in an inclined direction with respect to the width of the pocket so as to open the same. The pocket having been opened, the opener retires as the plunger advances to push the cartridge into the now open pocket. The said opener, as shown, is let into a groove 70 in the machine-frame 20 and held in place by two caps 71 secured thereto. For its positive operation, I employ a link 72 pivotally connected to it and at its opposite end connected to a lever 73 the inner end of which is beveled as at 74 for coaction with a spring-pressed pin 75 in the plunger 17. A helical spring 76 connecting the opener 18 with the machine-frame is employed for retracting the opener after the performance of its opening function.

To prevent the belt from being fed too far forward at any one time, I may employ a friction-drag 77 (Fig. 1) consisting of a pivotal plate 78 hung on a shaft 79 above the side flanges 42 and 43 and pressed down upon the belt by a spring 80, but I do not limit myself to using such a drag or any drag at all. In place of the serrated jaws 12 and 13, I might use jaws faced with rubber.

In the operation of my improved machine, its several parts are timed so that after the jaws 12 and 13 have gripped so much of the belt to be loaded as comprises one cartridge-pocket, the pocket-opener 18 advances and opens the pocket by entering the rear corner thereof, and then moves forward and inward between the two sides of the pocket, after which the opener retires as the plunger advances to push the lowermost cartridge in the hopper o hopper, causing the bullet-end of tridge to enter the already open p as the pocket opener retires and pocket has had an opportunity o The pointed end of the bullet sp pocket open as it enters the same, first engages the opposite side wa pocket with the serrated edges of iary jaws which are at this tim their normally closed positions by their springs. Now just as soc fabric is engaged with these lateral thrust of the incoming car prevented from swerving or defl belt laterally out of the true li travel through the machine. Th the accurate alinement of the car the belt when the same is loaded. being now firmly held against l flection, the cartridge continues to into the pocket, the auxiliary j gradually pushed outward by the until they merge, as it were, int rations 31 of the semi-circular g the main jaws 12 and 13. Thus operation of loading a cartridge belt, the same is gripped throu width by the main and auxiliary j firmly hold the belt against late tion during the entire loading As soon as the cartridge has bee the jaws open, and when they limit of their opening movement feeders advance to engage with tridge itself at points on opposit the belt, and force the loaded cart ward for a distance correspondi width of one pocket, the unloade of the belt being dragged along, by the said loaded cartridge, wl same is moved forward from be jaws and another pocket brough sition between the same. The again close upon the belt along tl the stitching which forms its div pocket-opener advances, and the of operations is repeated. Th opener pries the pockets open, a without injury to the belt-fabric belt may be used again and aga life greatly prolonged, wherea pockets are picked open by needle machines of the prior art, the fal belt is injured and the life of shortened.

I claim:—

1. In a machine for loading m cartridge-belts, the combination feeding means, of cartridge-feedi and two opposed concave belt-gri arranged to grip the belt transv hold it against lateral deflection insertion of a cartridge into the tained in the gripped portion o which is held by the said jaws substantially throughout its width.

2. In a machine for loading machine-gun cartridge-belts, the combination with opposed concave belt-feeding means, of cartridge-loading means, and a pair of belt-gripping jaws each of which is moved toward the belt for gripping a section of the same against lateral displacement substantially throughout its width while a cartridge is being fed into one of its pockets, and each of which is moved away from the belt to permit the same to be fed.

3. In a machine for loading machine-gun cartridge-belts, the combination with belt-feeding mechanism, of cartridge - feeding mechanism, and a pair of belt-gripping jaws arranged to grip the belt transversely and having their opposed inner faces concaved and serrated for gripping the belt substantially throughout its width.

4. In a machine for loading machine-gun cartridge-belts, the combination with belt-feeding mechanism, of cartridge - feeding mechanism, and a pair of belt-gripping jaws arranged to grip the belt transversely and having their inner faces recessed for the reception of the cartridges and each provided with an auxiliary gripping-jaw.

5. In a machine for loading machine-gun cartridge-belts, the combination with belt-feeding mechanism, of cartridge - feeding mechanism, and a pair of belt-gripping jaws arranged to grip the belt transversely and each recessed and serrated and each provided with a serrated auxiliary gripping-jaw arranged to gradually retire as a cartridge is fed into its pocket in the belt.

6. In a machine for loading machine-gun cartridge-belts, the combination with belt-feeding mechanism, of cartridge-feeding mechanism, and a pair of belt-gripping jaws arranged to grip the belt transversely and each recessed and serrated, and each provided with a pivotal spring-actuated, serrated auxiliary jaw.

7. In a machine for loading machine-gun cartridge-belts, the combination with belt-feeding mechanism, of cartridge-feeding mechanism, and a pair of belt-gripping jaws arranged to grip the belt transversely and connected together so that one operates the other in being moved toward and away from the belt for gripping the same and clearing the loaded cartridge preparatory to feeding the belt.

8. In a machine for loading machine-gun cartridge-belts, the combination with belt-feeding mechanism of cartridge - feeding mechanism, a pair of belt-gripping jaws arranged to grip the belt transversely in line with the path in which the cartridges are fed, each of the said jaws having its inner face recessed and serrated and each formed with a longitudinal slot, and a pair of pivotal spring-actuated auxiliary ing their edges serrated and nor jecting respectively, into the se cesses of the main jaws.

9. A machine for loading m cartridge-belts, having belt-feed anism including two reciprocating ers for successively engaging cartridge last loaded into the belt site sides of the belt, for feedin step-by-step.

10. A machine for loading m cartridge-belts, having belt-feed anism comprising two belt-feede on opposite sides of the belt in engage with the projecting ends cartridge loaded thereinto for f belt step-by-step, and means for ing the said belt-feeders.

11. In a machine for loading m cartridge-belts, the combination tridge-feeding means, of a pair of ping jaws located in line with a and arranged to grip the belt tr and a pair of belt-feeders arra right angle to the said jaws and to engage with the projecting e last cartridge loaded into the be ing the belt step-by-step.

12. In a machine for loading m cartridge-belts, the combinatio ciprocating belt-feeding means, o feeding means, belt-gripping me the belt by its opposite faces in li path in which the cartridges are pocket-opener obliquely arrange the successive pockets in the belt is fed step-by-step, for opening preparatory to the feeding of th thereinto.

13. In a machine for loading n cartridge-belts, the combination feeding means, of cartridge-fee belt-gripping means, and a po arranged to enter the successivel pockets in the belt obliquely, to the feeding of the cartridges 14. In a machine for loading n cartridge-belts, the combinatio feeding means, of cartridge-fee belt-gripping means, and a pocket opener arranged to entel sively presented pockets oblique tory to the feeding of cartridges 15. In a machine for loading r cartridge-belts, the combinatio feeding means, of belt-grippin ranged to grip the belt trans hold it against lateral deflectior feeding operation, means for pockets in the belt preparatory cartridges thereinto, and cartr means including a plunger car tractor.

16. In a machine for loading cartridge-belts, the combination with reciprocating belt-feeding means, of a spring-operated friction device for controlling the feeding of the belt, means for gripping the belt by its opposite faces in line with the path in which the cartridges are fed, whereby it is held against lateral deflection during the cartridge-feeding operation, pocket-opening means, and cartridge-feeding means.

In testimony whereof I have signed this specification in the presence of two subscribing witnesses.

RUDOLPH KRENZ.

Witnesses:
F. C. FAGAN,
H. B. JONES.